United States Patent
Henry et al.

(10) Patent No.: US 8,495,344 B2
(45) Date of Patent: Jul. 23, 2013

(54) SIMULTANEOUS EXECUTION RESUMPTION OF MULTIPLE PROCESSOR CORES AFTER CORE STATE INFORMATION DUMP TO FACILITATE DEBUGGING VIA MULTI-CORE PROCESSOR SIMULATOR USING THE STATE INFORMATION

(75) Inventors: G. Glenn Henry, Austin, TX (US); Jui-Shuan Chen, Austin, TX (US)

(73) Assignee: VIA Technologies, Inc., New Taipei (TW)

( * ) Notice: Subject to any disclaimer, the term of this patent is extended or adjusted under 35 U.S.C. 154(b) by 752 days.

(21) Appl. No.: 12/748,929

(22) Filed: Mar. 29, 2010

(65) Prior Publication Data

US 2011/0185153 A1 Jul. 28, 2011

Related U.S. Application Data

(60) Provisional application No. 61/297,505, filed on Jan. 22, 2010.

(51) Int. Cl.
G06F 7/38 (2006.01)
G06F 9/00 (2006.01)
G06F 9/44 (2006.01)
G06F 11/00 (2006.01)

(52) U.S. Cl.
USPC .............. 712/227; 712/220; 714/43; 714/45

(58) Field of Classification Search
None
See application file for complete search history.

(56) References Cited

U.S. PATENT DOCUMENTS

| | | | |
|---|---|---|---|
| 6,438,709 B2 | 8/2002 | Poisner | |
| 6,457,073 B2 * | 9/2002 | Barry et al. | 710/22 |
| 6,463,529 B1 | 10/2002 | Miller et al. | |
| 6,643,796 B1 | 11/2003 | Floyd et al. | |
| 6,687,865 B1 | 2/2004 | Dervisoglu et al. | |
| 6,728,904 B2 | 4/2004 | Kanekawa et al. | |
| 7,013,398 B2 * | 3/2006 | Zhao | 713/310 |
| 2001/0042198 A1 | 11/2001 | Poisner | |
| 2002/0062480 A1 | 5/2002 | Kirisawa | |
| 2002/0129309 A1 | 9/2002 | Floyd et al. | |
| 2003/0014264 A1 * | 1/2003 | Fujii et al. | 704/500 |
| 2003/0056154 A1 | 3/2003 | Edwards et al. | |
| 2004/0221196 A1 | 11/2004 | Datta et al. | |

(Continued)

FOREIGN PATENT DOCUMENTS

| | | |
|---|---|---|
| CN | 101000596 | 7/2007 |
| JP | 62256298 | 11/1987 |

*Primary Examiner* — Andrew Caldwell
*Assistant Examiner* — William B Partridge
(74) *Attorney, Agent, or Firm* — E. Alan Davis; James W. Huffman

(57) ABSTRACT

A multi-core microprocessor includes first and second processing cores and a bus coupling the first and second processing cores. The bus conveys messages between the first and second processing cores. The cores are configured such that: the first core stops executing user instructions and interrupts the second core via the bus, in response to detecting a predetermined event; the second core stops executing user instructions, in response to being interrupted by the first core; each core outputs its state after it stops executing user instructions; and each core waits to begin fetching and executing user instructions until it receives a notification from the other core via the bus that the other core is ready to begin fetching and executing user instructions. In one embodiment, the predetermined event comprises detecting that the first core has retired a predetermined number of instructions. In one embodiment, microcode waits for the notification.

26 Claims, 2 Drawing Sheets

U.S. PATENT DOCUMENTS

| | | |
|---|---|---|
| 2007/0180315 A1 | 8/2007 | Aizawa |
| 2007/0209072 A1 | 9/2007 | Chen |
| 2007/0214341 A1 | 9/2007 | Das |
| 2008/0016405 A1 | 1/2008 | Kitahara |
| 2008/0126877 A1 | 5/2008 | Alsup |
| 2008/0184055 A1 | 7/2008 | Moyer et al. |
| 2009/0313507 A1 | 12/2009 | Swaine et al. |
| 2009/0313623 A1 | 12/2009 | Coskun et al. |
| 2010/0064173 A1 | 3/2010 | Pedersen et al. |
| 2011/0010530 A1 | 1/2011 | Henry et al. |
| 2011/0010531 A1 | 1/2011 | Henry et al. |
| 2011/0053649 A1 | 3/2011 | Wilson |
| 2011/0143809 A1 | 6/2011 | Salomone et al. |
| 2011/0185160 A1 | 7/2011 | Gaskins et al. |
| 2011/0202796 A1 | 8/2011 | Henry et al. |
| 2012/0185681 A1 | 7/2012 | Henry et al. |

* cited by examiner

SIMULTANEOUS EXECUTION RESUMPTION OF MULTIPLE PROCESSOR CORES AFTER CORE STATE INFORMATION DUMP TO FACILITATE DEBUGGING VIA MULTI-CORE PROCESSOR SIMULATOR USING THE STATE INFORMATION

CROSS REFERENCE TO RELATED APPLICATION(S)

This application claims priority based on U.S. Provisional Application Ser. No. 61/297,505, filed Jan. 22, 2010, entitled SIMULTANEOUS EXECUTION RESUMPTION OF MULTIPLE PROCESSOR CORES AFTER CORE STATE INFORMATION DUMP TO FACILITATE DEBUGGING VIA MULTI-CORE PROCESSOR SIMULATOR USING THE STATE INFORMATION, which is hereby incorporated by reference in its entirety.

FIELD OF THE INVENTION

The present invention relates in general to the field of multi-core processors, and particularly to the debugging thereof.

BACKGROUND OF THE INVENTION

A processor may include a set of microcode routines that lie dormant until activated by a software write to a control register (e.g., Write to Model Specific Register (WRMSR) instruction). The set of microcode routines is referred to herein as "tracer," which may be used as a tool to debug and performance tune the processor. Once activated, various events can trigger the tracer to gather processor state information and write it to specified addresses in memory. One way to use tracer is to invoke it on regular intervals. For example, every time the processor has executed and retired N instructions (e.g., 100,000 instructions—the number is specified by the user), tracer dumps the processor state to memory. The dumped processor state is referred to herein as a checkpoint. An engineer debugging the processor may then take the processor state from the checkpoints and replay them into a simulator.

The simulator receives the processor state from the checkpoint as part of its input. The input is the state of the registers (and optionally the cache memories of the processor) and the state of memory, which includes the programs executed by the processor. The simulator is a functional model of a "golden" processor. That is, the simulator starts with the initial input state of the processor and executes and retires the instructions of the programs in memory to produce the correct output state that a processor that conforms to the target processor architecture (e.g., x86 architecture) would produce. This output state can then be compared to the output state generated by the actual processor, which may be helpful in debugging design errors. The process is broadly described here:

1. Processor executes/retires N instructions and tracer dumps state checkpoint to memory.
2. Tracer restarts the processor executing where it left off. (In one implementation, tracer resets the processor and the reset microcode re-loads the processor state from the state checkpoint just dumped to memory.)
3. Steps 1 and 2 continue until the user detects that the bug has occurred, stops the cycle, and saves the state checkpoints to a file.
4. Feed the first state checkpoint from the file to the simulator.
5. The simulator executes/retires N instructions.
6. Compare the current simulated processor state with the next state checkpoint, and if they mismatch, the logic designer uses the information to debug the processor.
7. Otherwise, feed the next state checkpoint from the file to the simulator and then repeat steps 5 and 6.

In addition to the memory footprint and register state, the input to the simulator includes information about the occurrence of events generated by agents outside the processor. For example, interrupt requests are sent to the processor. Additionally, other agents in the system read and write to memory shared by the processor with the other agents. The other agents may be I/O devices or other processors. These events occur on the architectural processor bus shared by the various agents and can therefore be captured by a logic analyzer connected to the bus and correlated in time relative to the dumping of the state checkpoints to memory on the bus.

In the case of a dual-core processor, actions by one core may affect the function of the other core. For example, memory accesses by one core may affect operation of the other core. In particular, some bugs occur only during interaction between the two cores.

A problem has been detected in the process of debugging a dual-core processor using a simulator. Specifically, each core in the actual processor part independently performs the tracer stops, dumps, and restarts described above in steps 1 and 2. Consequently, the state checkpoints generated by the two cores in operation of the actual part do not necessarily correlate in time with one another. Additionally, some core interaction-related bugs were not able to be reproduced likely due to the fact that the tracer stops and restarts were not coordinated.

BRIEF SUMMARY OF INVENTION

In one aspect the present invention provides a multi-core microprocessor. The multi-core microprocessor includes first and second processing cores and a bus coupling the first and second processing cores. The bus conveys messages between the first and second processing cores. The first and second processing cores are configured such that: the first core stops executing user instructions and interrupts the second core via the bus, in response to detecting a predetermined event; the second core stops executing user instructions, in response to being interrupted by the first core; each core outputs its state after it stops executing user instructions; and each core waits to begin fetching and executing user instructions until it receives a notification from the other core via the bus that the other core is ready to begin fetching and executing user instructions.

In another aspect, the present invention provides a method for debugging a multi-core microprocessor comprising first and second processing cores and a bus configured to convey messages between the first and second processing cores. The method includes the first core detecting a predetermined event. The method also includes the first core stopping executing user instructions in response to detecting the predetermined event. The method also includes the first core interrupting the second core via the bus. The method also includes the second core stopping executing user instructions in response to being interrupted by the first core. The method also includes each core outputting its state after it stops executing user instructions. The method also includes each core waiting to begin fetching and executing user instructions until it receives a notification from the other core via the bus that the other core is ready to begin fetching and executing user instructions.

In yet another aspect, the present invention provides a computer program product encoded in at least one computer readable medium for use with a computing device, the computer program product comprising computer readable program code embodied in said medium for specifying a multi-core microprocessor. The computer readable program code includes first program code for specifying first and second processing cores. The computer readable program code also includes second program code for specifying a bus, coupling the first and second processing cores, configured to convey messages between the first and second processing cores. The first and second processing cores are configured such that: the first core stops executing user instructions and interrupts the second core via the bus, in response to detecting a predetermined event; the second core stops executing user instructions, in response to being interrupted by the first core; each core outputs its state after it stops executing user instructions; and each core waits to begin fetching and executing user instructions until it receives a notification from the other core via the bus that the other core is ready to begin fetching and executing user instructions.

DETAILED DESCRIPTION OF THE INVENTION

To solve the problem described above, the dual-core processor has been modified such that when tracer triggers on one core, it interrupts the other core to cause tracer on the other core to dump a state checkpoint. Then, the two cores communicate with one another such that they restart at the same time.

Figure 1:
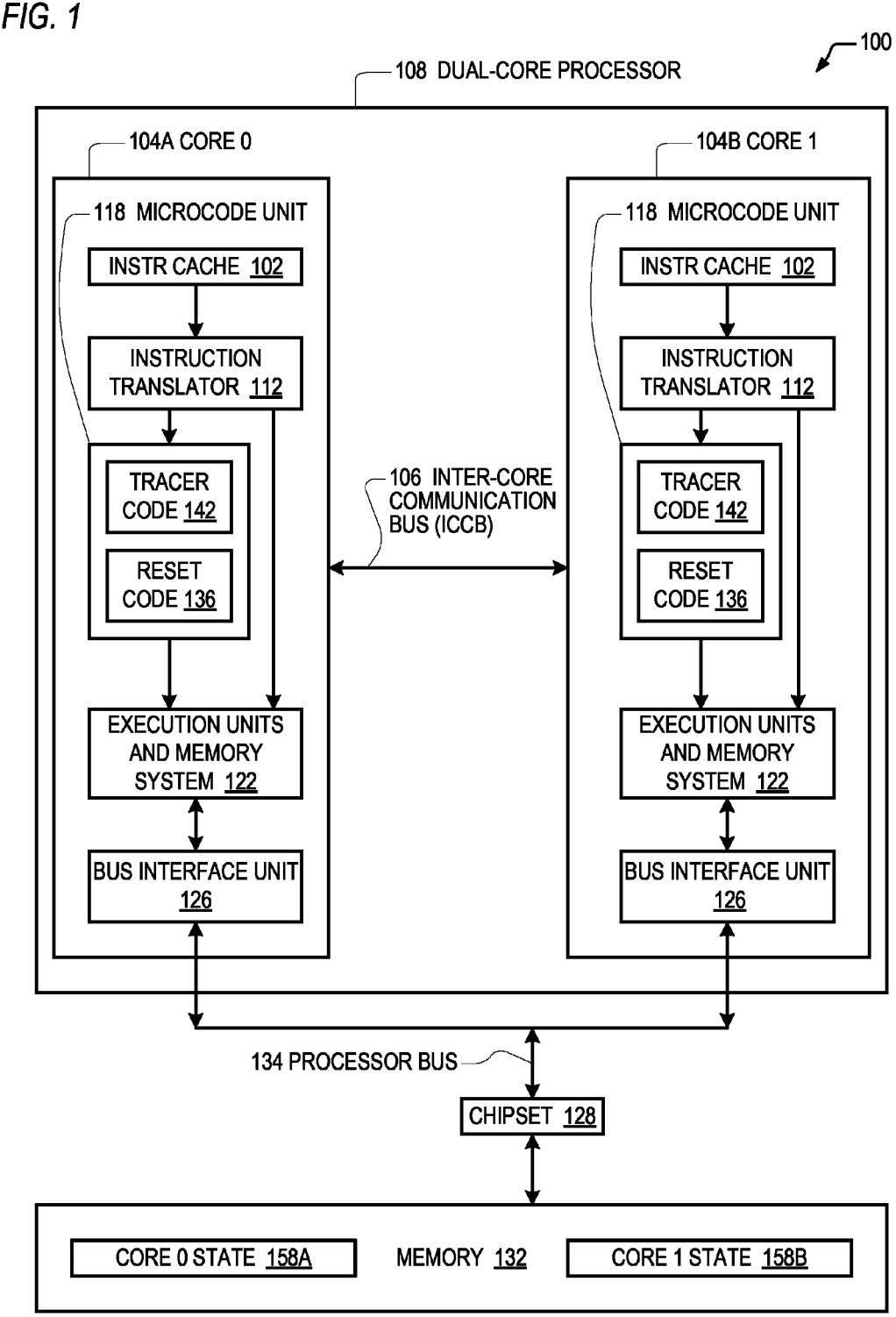
FIG. 1 is a block diagram illustrating a system that includes a dual-core processor according to the present invention.

Referring now to FIG. 1, a block diagram illustrating a system 100 that includes a dual-core processor 108 according to the present invention is shown. The system 100 includes a chipset 128 coupled to the dual-core processor 108 by a processor bus 134. The system 100 also includes a system memory 132 coupled to the chipset 128. The dual-core processor 108 includes two cores, referred to individually as core 0 104A and core 1 104B and referred to collectively as cores 104. Core 0 104A writes its state as core 0 state 158A to the system memory 132 and core 1 104B writes its state as core 1 state 158B to the system memory 132 as described below. The core state 158 includes the contents of the registers and cache memories of the core 104. In one embodiment, the contents of the cache memories is not included in the core state 158 because tracer performs a write back invalidate operation to force the cache data to memory such that the memory state can be captured.

Each core 104 includes an instruction cache 102 and an instruction translator 112 that translates instructions fetched from the instruction cache 102 into microinstructions for provision to execution units and a memory subsystem 122 of the core 104. The core 104 also includes a bus interface unit (BIU) 126, coupled to the execution units and memory subsystem 122, which interfaces the core 104 to the processor bus 134.

The core 104 also includes a microcode unit 118. The microcode unit 118 includes a microsequencer (not shown) that fetches instructions from a microcode ROM (not shown). The microcode ROM stores microcode instructions. In particular, the microcode instructions include reset microcode 136 and tracer microcode 142.

The core 104 begins fetching and executing the reset microcode 136 shortly after the core 104 is reset. The reset microcode 136 initializes the core 104, and at the end of initialization, causes the core 104 to begin fetching user programs from memory. Specifically, before tracer 142 initiates a reset of the core 104, it sets a flag to indicate to the reset microcode 136 that the reset was initiated by tracer 142. The flag resides in a non-volatile, non-user-addressable storage element. That is, the flag value survives the tracer-initiated reset, but does not survive a power-on reset, i.e., the flag defaults to a predetermined value in response to a power-on reset. Additionally, tracer 142 saves in the non-volatile storage element the memory address of the location in memory where it dumped the most recent state checkpoint. Consequently, when the reset microcode 136 runs, it detects that the flag is set and loads the most recent dumped state of the processor from the location in memory saved in the non-volatile storage element. The restored state includes the instruction pointer value of the program that was executing when tracer 142 was triggered. Thus, when the reset microcode 136 causes the core 104 to begin fetching user program instructions, the core 104 will resume execution where it left off at the most recent tracer 142 state checkpoint. According to embodiments described herein, advantageously the reset microcode 136 waits to cause the core 104 to resume fetching user code until it determines that the other core 104 is also ready to do so. According to one embodiment, the BIU 126 includes a control register that is programmable by the tracer microcode 142 to request the reset.

Core 0 104A and core 1 104B communicate with one another via an inter-core communication bus (ICCB) 106. According to one embodiment, the ICCB 106 is a serial bus; however, other types of buses may be employed. In particular, the cores 104 communicate via the ICCB 106 to interrupt one another to cause tracer 142 to be triggered and to resume fetching user instructions at the same time when coming out of reset, as described herein. The ICCB 106 is distinct from the processor bus 134. Whereas the processor bus 134 is the architectural processor bus of the dual-core processor 102, the ICCB 106 is a non-architectural bus. That is, user programs cannot instruct the cores 104 to communicate on the ICCB 106; rather, only non-user code, namely the microcode 136/142 executing on a core 104, can instruct the cores 104 to communicate on the ICCB 106. Furthermore, only the cores 104 within the dual-core processor 102 can communicate on the ICCB 106. That is, no other cores or processors outside the dual-core processor 102 can communicate on the ICCB 106. The ICCB 106 is contained within a single package comprising the cores 104 and the ICCB 106. In one embodiment, the dual-core processor 102 is a single die. In one embodiment, each core 104 is on its own die, and the ICCB 106 couples the dies together.

Figure 2:
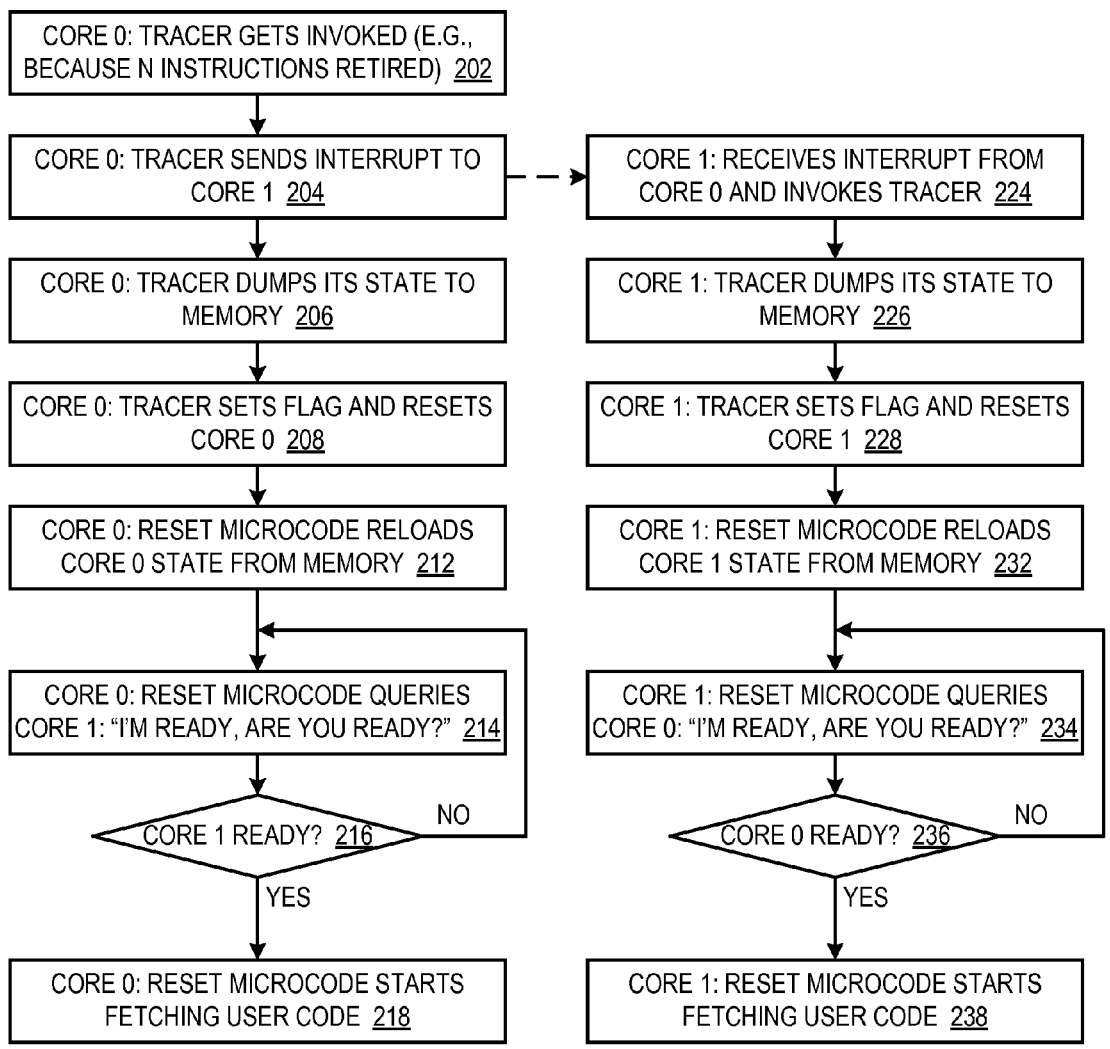
FIG. 2 is a flowchart illustrating operation of the system of FIG. 1.

Referring now to FIG. 2, a flowchart illustrating operation of the system 100 of FIG. 1 is shown. Flow begins at block 202.

At block 202, tracer 142 gets invoked on core 0 104A. For example, core 0 104A may detect that core 0 104A has retired N instructions since the last checkpoint of core 0 104A, and invokes tracer 142 in response. Flow proceeds to block 204.

At block 204, tracer 142 running on core 0 104A sends an interrupt message to core 1 104B via the ICCB 106 to notify core 1 104B that it needs to invoke tracer 142. Flow proceeds on core 0 104A to block 206 and proceeds in parallel on core 1 104B to block 224.

At block 206, tracer 142 running on core 0 104A dumps the state of core 0 104A to the system memory 132 as core 0 state 158A. Flow proceeds to block 208.

At block 208, tracer 142 running on core 0 104A resets core 0 104A. As discussed above, prior to resetting the core 0 104A, tracer 142 sets the flag and saves the address of the core 0 state 158A in the non-volatile storage element. Flow proceeds to block 212.

At block 212, core 0 104A is reset and begins executing its reset microcode 136. The reset microcode 136 detects that the flag is set and responsively loads the core 0 state 158A from system memory 132 into the core 0 104A as part of its initialization function. Flow proceeds to block 214.

At block 214, the reset microcode 136 running on core 0 104A sends a message on the ICCB 106 to core 1 104B asking whether core 1 104B has completed its initialization of core 1 104B and is ready to begin fetching and executing user program instructions. Flow proceeds to decision block 216.

At decision block 216, the reset microcode 136 running on core 0 104A determines whether it has received a message back from core 1 104B on the ICCB 106 indicating that core 1 104B is ready to begin fetching and executing user program instructions. If so, flow proceeds to block 218; otherwise, flow returns to block 214. In one embodiment, the reset microcode 136 loops for a predetermined time at decision block 216 waiting to receive the ready message from core 1 104B before returning to block 214 to transmit another ready message. In one embodiment, the reset microcode 136 keeps count of the number of times it has looped waiting to receive the ready message from core 1 104B before it assumes core 1 104B is dead, in which case it proceeds to block 218.

At block 218, the reset microcode 136 running on core 0 104A causes core 0 104A to resume fetching and executing user program instructions at the instruction pointer value loaded from the core 0 state 158A at block 212. Flow ends at block 218.

At block 224, core 1 104B receives the interrupt message from core 0 104A that core 0 104A transmitted at block 204. In response, core 1 104B invokes tracer 142. Flow proceeds to block 226.

At block 226, tracer 142 running on core 1 104B dumps the state of core 1 104B to the system memory 132 as core 1 state 158B. Flow proceeds to block 228.

At block 228, tracer 142 running on core 1 104B resets core 1 104B. As discussed above, prior to resetting the core 1 104B, tracer 142 sets the flag and saves the address of the core 1 state 158B in the non-volatile storage element. Flow proceeds to block 232.

At block 232, core 1 104B is reset and begins executing its reset microcode 136. The reset microcode 136 detects that the flag is set and responsively loads the core 1 state 158B from system memory 132 into the core 1, 104B as part of its initialization function. Flow proceeds to block 234.

At block 234, the reset microcode 136 running on core 1 104B sends a message on the ICCB 106 to core 0 104A asking whether core 0 104A has completed its initialization of core 0 104A and is ready to begin fetching and executing user program instructions. Flow proceeds to decision block 236.

At decision block 236, the reset microcode 136 running on core 1 104B determines whether it has received a message back from core 0 104A on the ICCB 106 indicating that core 0 104A is ready to begin fetching and executing user program instructions. If so, flow proceeds to block 238; otherwise, flow returns to block 234. In one embodiment, the reset microcode 136 loops for a predetermined time at decision block 236 waiting to receive the ready message from core 0 104A before returning to block 234 to transmit another ready message. In one embodiment, the reset microcode 136 keeps count of the number of times it has looped waiting to receive the ready message from core 0 104A before it assumes core 0 104A is dead, in which case it proceeds to block 238.

At block 238, the reset microcode 136 running on core 1 104B causes core 1 104B to resume fetching and executing user program instructions at the instruction pointer value loaded from the core 1 state 158B at block 232. Flow ends at block 238.

Thus, as may be observed from FIG. 2, the two cores 104 both operate to dump their state checkpoint to memory at approximately the same time and operate to resume execution of user programs at the same time. In one embodiment, the two cores 104 achieve resuming execution within approximately one processor bus clock cycle of one another.

Although a dual-core processor 108 has been described with two cores, other embodiments of a multi-core processor 108 with more than two cores are contemplated in which each core includes an ability to communicate with the other core to determine whether all of them are ready to come out of reset so that all the cores can come of out of reset and begin fetching user code at the same time.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog™ hardware description language (HDL), VHSIC hardware description language (VHDL), and so on, or other available programs. Such software can be disposed in any known computer usable medium such as magnetic tape, semiconductor, magnetic disk, or optical disc (e.g., compact disc read-only memory (CD-ROM), Digital Versatile Disk (DVD-ROM), etc.), a network, wire line, wireless or other communications medium. Embodiments of the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device which may be used in a general purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

The invention claimed is:

1. A multi-core microprocessor, comprising:
    first and second processing cores; and
    a bus, coupling the first and second processing cores, configured to convey messages between the first and second processing cores;

wherein the first and second processing cores are configured such that:
the first processing core stops executing user instructions and interrupts the second processing core via the bus, in response to detecting a predetermined event;
the second processing core stops executing user instructions, in response to being interrupted by the first processing core;
each processing core outputs its state after it stops executing user instructions; and
each processing core waits to begin fetching and executing user instructions until it receives a notification from the other processing core via the bus that the other processing core is ready to begin fetching and executing user instructions.

2. The microprocessor of claim 1, wherein the predetermined event comprises detecting that the first processing core has retired a predetermined number of instructions.

3. The microprocessor of claim 1, wherein the predetermined event comprises invocation of microcode by the first processing core.

4. The microprocessor of claim 1, wherein the first and second processing cores are further configured such that:
each processing core resets itself after outputting its state.

5. The microprocessor of claim 4, wherein the first and second processing cores are further configured such that:
each processing core reloads its state after being reset.

6. The microprocessor of claim 5, wherein the first and second processing cores are configured such that each processing core outputs its state to a memory external to the multi-core microprocessor and each processing core reloads its state from the memory after being reset.

7. The microprocessor of claim 1, wherein the first and second processing cores are further configured such that:
each processing core queries the other core via the bus to determine whether the other processing core is ready to begin fetching and executing user instructions.

8. The microprocessor of claim 1, wherein the bus is a non-architectural bus.

9. The microprocessor of claim 1, wherein the bus is configured such that only the processing cores within the multi-core microprocessor are configured to communicate on the bus.

10. The microprocessor of claim 1, wherein a single package comprises the processing cores and the bus.

11. The microprocessor of claim 1, wherein a single die comprises the processing cores and the bus.

12. The microprocessor of claim 1, wherein a first die comprises the first processing core, and a second die comprises the second processing core, and the bus couples the first and second dies together.

13. The microprocessor of claim 1, wherein microcode in each of the first and second processing cores is configured to wait to begin fetching and executing user instructions until it receives a notification from the other processing core via the bus that the other processing core is ready to begin fetching and executing user instructions.

14. The microprocessor of claim 1, wherein microcode in each of the first and second cores is configured to outputs the processing core's state.

15. A method for debugging a multi-core microprocessor comprising first and second processing cores and a bus configured to convey messages between the first and second processing cores, the method comprising:
detecting, by the first processing core, a predetermined event;
stopping executing, by the first processing core, user instructions, in response to said detecting the predetermined event;
interrupting, by the first processing core, the second processing core via the bus;
stopping executing, by the second processing core, user instructions, in response to being interrupted by the first processing core;
outputting, by each processing core, its state after it stops executing user instructions; and
waiting, by each processing core, to begin fetching and executing user instructions until it receives a notification from the other processing core via the bus that the other processing core is ready to begin fetching and executing user instructions.

16. The method of claim 15, wherein the predetermined event comprises detecting that the first processing core has retired a predetermined number of instructions.

17. The method of claim 15, wherein the predetermined event comprises invocation of microcode by the first processing core.

18. The method of claim 15, further comprising:
resetting itself, by each processing core, after said outputting its state.

19. The method of claim 18, further comprising:
reloading, by each processing core, its state after being reset.

20. The method of claim 15, further comprising:
querying, by each processing core, the processing other core via the bus to determine whether the other processing core is ready to begin fetching and executing user instructions.

21. The method of claim 15, wherein the bus is a non-architectural bus.

22. The method of claim 15, wherein the bus is configured such that only the processing cores within the multi-core microprocessor are configured to communicate on the bus.

23. The method of claim 15, wherein microcode in each of the first and second processing cores is configured to perform said waiting to begin fetching and executing user instructions until it receives a notification from the other processing core via the bus that the other processing core is ready to begin fetching and executing user instructions.

24. The method of claim 15, wherein microcode in each of the first and second processing cores is configured to perform said outputting the processing core's state.

25. A computer program product encoded in at least one computer readable non-transitory medium for use with a computing device, the computer program product comprising:
computer readable program code embodied in said medium, for specifying a multi-core microprocessor, the computer readable program code comprising:
first program code for specifying first and second processing cores; and
second program code for specifying a bus, coupling the first and second processing cores, configured to convey messages between the first and second processing cores;
wherein the first and second processing cores are configured such that:
the first processing core stops executing user instructions and interrupts the second processing core via the bus, in response to detecting a predetermined event;

the second processing core stops executing user instructions, in response to being interrupted by the first processing core;

each processing core outputs its state after it stops executing user instructions; and each processing core waits to begin fetching and executing user instructions until it receives a notification from the other processing core via the bus that the other processing core is ready to begin fetching and executing user instructions.

26. The computer program product of claim 25, wherein the at least one computer readable non-transitory medium is selected from the set of a disk, tape, or other magnetic, optical, or electronic storage medium.

* * * * *